(12) United States Patent
McCuen

(10) Patent No.: US 12,271,499 B2
(45) Date of Patent: *Apr. 8, 2025

(54) NON-PERSISTENT DATA CACHING WEB SERVER

(71) Applicant: Capital One Services, LLC, McLean, VA (US)

(72) Inventor: Riley McCuen, Creve Coeur, MO (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/634,199

(22) Filed: Apr. 12, 2024

(65) Prior Publication Data

US 2024/0281551 A1 Aug. 22, 2024

Related U.S. Application Data

(63) Continuation of application No. 17/109,321, filed on Dec. 2, 2020, now Pat. No. 11,983,287.

(51) Int. Cl.
*H04L 9/40* (2022.01)
*G06F 9/455* (2018.01)
*G06F 21/62* (2013.01)
*H04L 67/568* (2022.01)

(52) U.S. Cl.
CPC ...... *G06F 21/6218* (2013.01); *G06F 9/45558* (2013.01); *H04L 63/0428* (2013.01); *H04L 67/568* (2022.05)

(58) Field of Classification Search
CPC ............. G06F 21/6218; G06F 9/45558; H04L 67/568; H04L 63/0428; H04L 63/10
See application file for complete search history.

(56) References Cited

U.S. PATENT DOCUMENTS

| | | |
|---|---|---|
| 6,957,249 B2 | 10/2005 | Salo et al. |
| 7,076,518 B1 | 7/2006 | Twede |
| 8,060,926 B1 | 11/2011 | Ebrahimi et al. |
| 8,839,004 B1 | 9/2014 | Bennett et al. |
| 8,924,867 B2 | 12/2014 | Arnold |
| 9,058,214 B2 | 6/2015 | Ragusa et al. |
| 10,192,072 B1 | 1/2019 | Galvin, Jr. et al. |
| 10,728,274 B2 | 7/2020 | Uriel et al. |
| 10,728,324 B2 | 7/2020 | Tucker et al. |
| 10,805,246 B1 | 10/2020 | Egles et al. |

(Continued)

FOREIGN PATENT DOCUMENTS

GB 2506237 A 3/2014

*Primary Examiner* — Michael R Vaughan
*Assistant Examiner* — Abdullah Almamun
(74) *Attorney, Agent, or Firm* — Banner & Witcoff, Ltd.

(57) ABSTRACT

Systems as described herein may implement non-persistent data caching using a dedicated web server. A non-persistent data caching system may determine that an application, executing on a computing device may require access to secure data located on a remote server external to the computing device. The non-persistent data caching system may initiate a dedicated web server on the computing device, retrieve the secure data from the remote server, and store the secure data in a volatile memory of the computing device. The non-persistent data caching system may subsequently redirect a request for at least a portion of the secure data from the application and to the dedicated web server, and the dedicated web server may send the requested portion to the application.

20 Claims, 5 Drawing Sheets

(56) References Cited

U.S. PATENT DOCUMENTS

| | | |
|---|---|---|
| 2012/0278878 A1 | 11/2012 | Barkie et al. |
| 2016/0180102 A1 | 6/2016 | Kim et al. |
| 2016/0337104 A1 | 11/2016 | Kalligudd |
| 2018/0181409 A1 | 6/2018 | Han et al. |
| 2019/0272185 A1 | 9/2019 | Mukraj et al. |
| 2021/0014058 A1 | 1/2021 | Finchelstein et al. |

NON-PERSISTENT DATA CACHING WEB SERVER

CROSS-REFERENCE TO RELATED APPLICATIONS

This application is a continuation of and claims priority to co-pending U.S. patent application Ser. No. 17/109,321 filed on Dec. 2, 2020, and entitled "Non-Persistent Data Caching Web Server," the contents of which are incorporated by reference in its entirety.

FIELD OF USE

Aspects of the disclosure relate generally to big data and more specifically to secure data processing and management.

BACKGROUND

There are a large number of legacy enterprise applications that require access to secure data from remote systems. As enterprises in the cloud expand their services, the secure data may be encrypted and tokenized to provide increased security in the legacy systems. However, such a migration approach may be time consuming and error-prone. In these systems, the user may download the encrypted or tokenized data, store the encrypted data in a persistent storage, and decrypt or detokenize the data as needed. As a result, such an approach may consume a significant amount of processing power and security may be lost in the process.

Aspects described herein may address these and other problems, and generally improve the security, efficiency, and speed of processing secure data using a non-persistent data caching mechanism via a dedicated web server.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Systems as described herein may include features for non-persistent data caching via a dedicated web server. A non-persistent data caching system may determine that an application executing on a computing device may require access to secure data located on a remote data server external to the computing device. The non-persistent data caching system may initiate a dedicated web server on the computing device within a session for a user that requests the access. The secure data may be retrieved from the remote data server, and stored in a volatile memory of the computing device, wherein the access to the volatile memory may be limited to the user within the session. The non-persistent data caching system may redirect a request for the secure data to the dedicated web server, which may in turn send the requested secure data to the application.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

Figure 1:
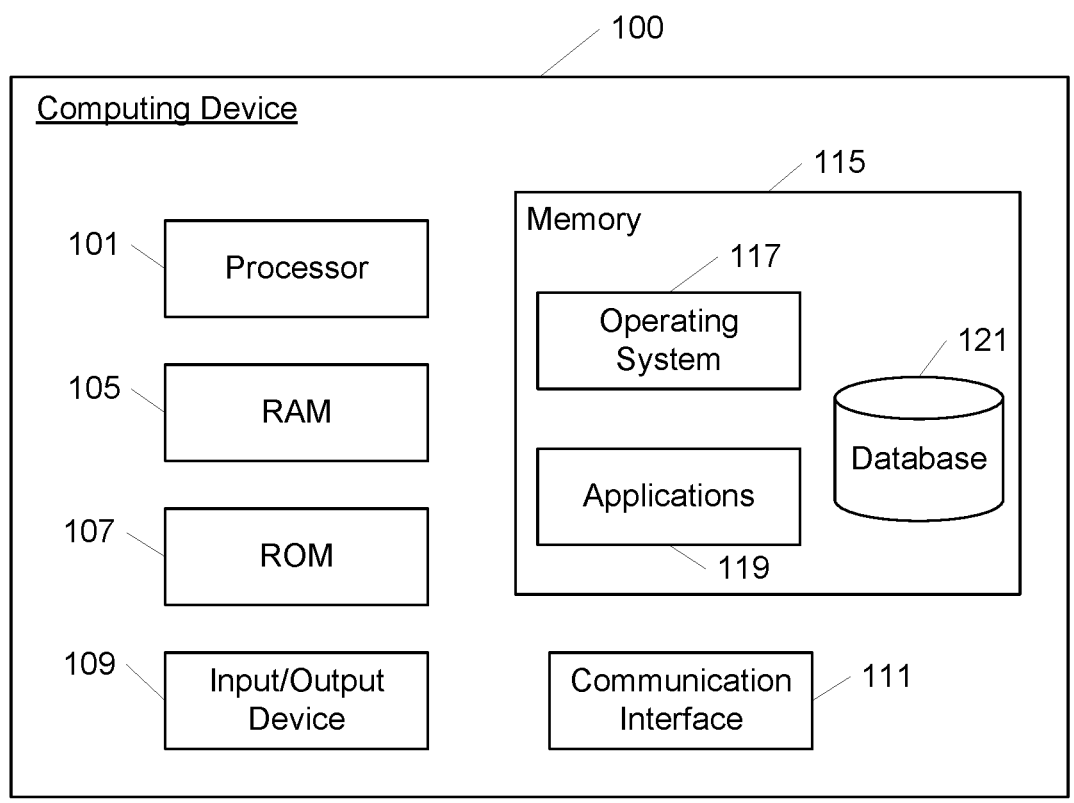
FIG. 1 shows an example computing device in accordance with one or more aspects described herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for non-persistent data caching via a dedicated web server. The secure data management system may create an in-memory file to store the secure data. The in-memory file may be assigned to a file data stream, and the secure data may be downloaded to the in-memory file via the file data stream. The secure data may be stored in the volatile memory, rather than in a persistent storage of the computing device, in a non-tokenized or unencrypted format. An application executing on a computing device may communicate with a dedicated web server on the computing device via a local loopback interface.

The non-persistent data caching system as described herein allows for initiating a dedicated web server on the computing device and within the session for a user. The computing device may host a virtual desktop infrastructure (VDI), and the session may be a VDI session associated with the user. The non-persistent data caching system may terminate the session for the user and terminate the application executing on the computing device. After the application is terminated, the non-persistent data caching system may delete the secure data from the volatile memory and terminate the dedicated web server on the computing device.

In many aspects, the secure data may be cached in the volatile memory of the computing device. Upon receiving a request for a new portion of the secure data from a user, the request may be redirected from the application to the dedicated web server within the session for the user. In response to the request, the requested new portion may be sent from the dedicated web server to the application.

In many aspects, the non-persistent data caching system may facilitate the migration of legacy applications into a more secured environment. An example non-persistent data caching system may implement a dedicated web server local to the legacy application or may implement a library in the legacy application, which may provide a caching layer using a volatile memory. The non-persistent data caching system may restrict the access to the volatile memory and control the operations of the dedicated web server in the volatile memory. A legacy application may require minimal change to its codes to migrate to the new secured environment. A dedicated web server may be built for the legacy application and the legacy application may be pointed to the dedicated web server, such that the migration process may be transparent to the legacy application. The dedicated web server may handle HTTP requests from the legacy application, and retrieve secure data and store in the volatile memory. The dedicated web server may serve as a proxy between the legacy application and a remote data server, and may provide a service of a virtual server. There may be less exposure and less security concerns for the secure data stored in the volatile memory and data may be stored in unencrypted or non-tokenized format. The communications between the legacy application and the dedicated web server may use HTTP protocols. For example, the legacy application may be implemented in a first programming language such as C++ and the dedicated web server may be implemented in a second programing language, such as Python. The non-persistent data caching system may provide a language agnostic approach to facilitate the migration of diverse legacy applications.

Computing Devices

FIG. 1 is a computing device 100 that may be used with one or more of the computational systems is described. The computing device 100 may include a processor 103 for controlling overall operation of the computing device 100 and its associated components, including RAM 105, ROM 107, input/output device 109, communication interface 111, and/or memory 115. A data bus may interconnect processor(s) 103, RAM 105, ROM 107, memory 115, I/O device 109, and/or communication interface 111. In some embodiments, computing device 100 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 109 may include a microphone, keypad, touch screen, and/or stylus through which a user of the computing device 100 may provide input, and may also include one or more of a speaker for providing audio output and a video display device for providing textual, audiovisual, and/or graphical output. Software may be stored within memory 115 to provide instructions to processor 103 allowing computing device 100 to perform various actions. Memory 115 may store software used by the computing device 100, such as an operating system 117, application programs 119, and/or an associated internal database 121. The various hardware memory units in memory 115 may include volatile and nonvolatile, removable and non-removable media implemented in any method or technology for storage of information such as computer-readable instructions, data structures, program modules, or other data. Memory 115 may include one or more physical persistent memory devices and/or one or more non-persistent memory devices. Memory 115 may include, but is not limited to, random access memory (RAM) 105, read only memory (ROM) 107, electronically erasable programmable read only memory (EEPROM), flash memory or other memory technology (EEPROM), flash memory or other memory technology, optical disk storage, magnetic cassettes, magnetic tape, magnetic disk storage or other magnetic storage devices, or any other medium that may be used to store the desired information and that may be accessed by processor 103.

Communication interface 111 may include one or more transceivers, digital signal processors, and/or additional circuitry and software for communicating via any network, wired or wireless, using any protocol as described herein.

Processor 103 may include a single central processing unit (CPU), which may be a single-core or multi-core processor, or may include multiple CPUs. Processor(s) 103 and associated components may allow the computing device 100 to execute a series of computer-readable instructions to perform some or all of the processes described herein. Although not shown in FIG. 1, various elements within memory 115 or other components in computing device 100, may include one or more caches including, but not limited to, CPU caches used by the processor 103, page caches used by the operating system 117, disk caches of a hard drive, and/or database caches used to cache content from database 121. For embodiments including a CPU cache, the CPU cache may be used by one or more processors 103 to reduce memory latency and access time. A processor 103 may retrieve data from or write data to the CPU cache rather than reading/writing to memory 115, which may improve the speed of these operations. In some examples, a database cache may be created in which certain data from a database 121 is cached in a separate smaller database in a memory separate from the database, such as in RAM 105 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 100 are described separately, functionality of the various components may be combined and/or performed by a single component and/or multiple computing devices in communication without departing from the invention.

Non-Persistent Data Caching Systems

Figure 2:
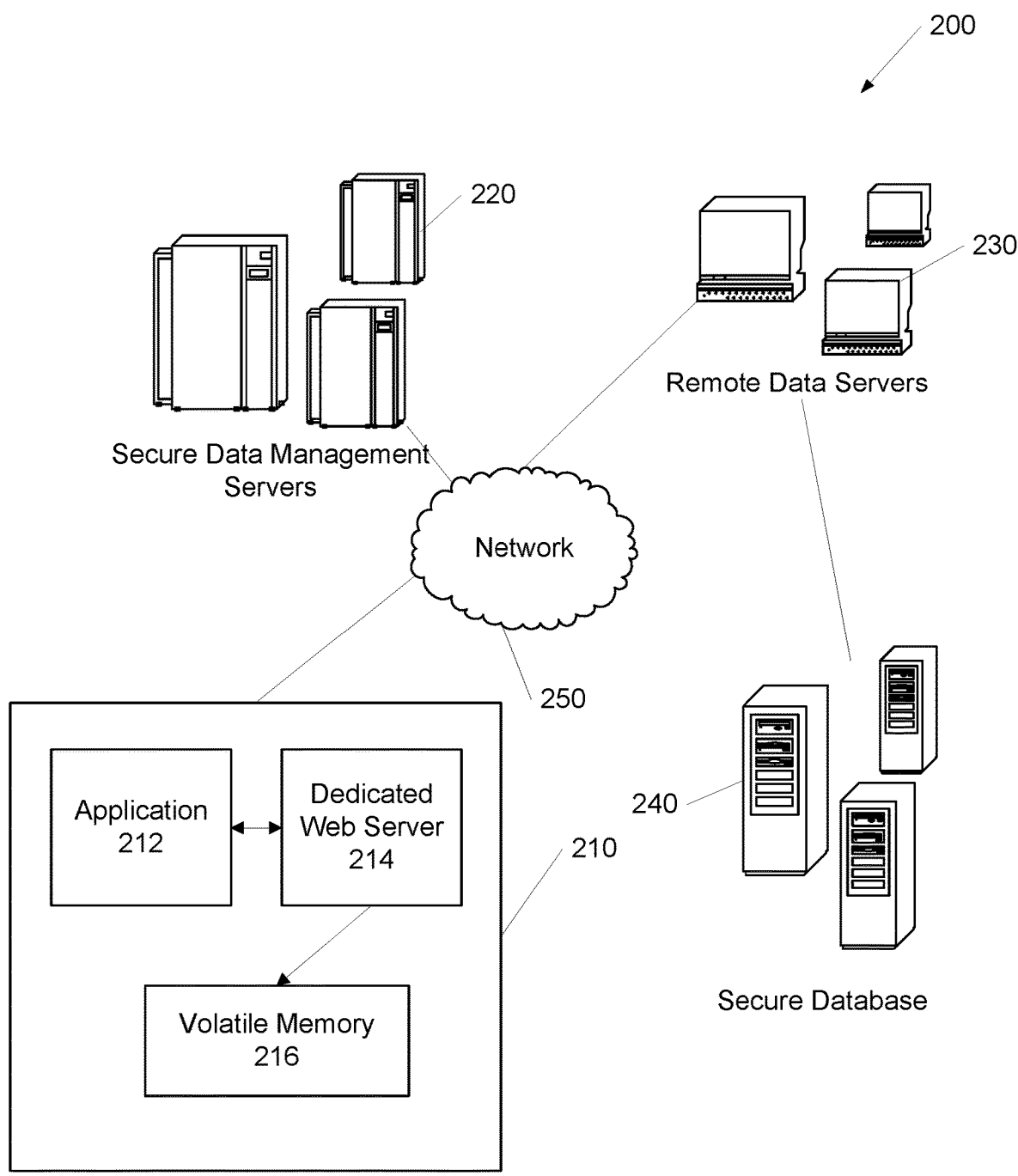
FIG. 2 shows an example system for non-persistent data caching via a dedicated web server in which one or more aspects described herein may be implemented.

FIG. 2 shows an example non-persistent data caching system 200. The non-persistent data caching system 200 may include at least one computing devices 210, at least one secure data management servers 220, at least one remote data servers 230, and/or at least one secure databases 240 in communication via a network 280. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 1.

Computing devices 210 may host an application 212, a dedicated web server 214 and volatile memory 216. A user may execute application 212 on computing device 210, which may request to access secure data from remote data servers 230 or send secure data to remote data servers 230.

For example, application 212 may submit transaction information related to the user such as a user identifier, a transaction amount, merchant information and a transaction timestamp, and/or send a request to obtain a financial statement associated with previous transactions. Computing devices 210 may host dedicated web server 214 for application 212. Dedicated web server 214 may intercept a request originated from application 212, and communicate with remote data servers 230 on behalf of application 212. Dedicated web server 214 may retrieve the secure data from remote data servers 230 and store the secure data in volatile memory 216. Dedicated web server 214 may not download the secure data to a persistent storage on computing device 210. The secure data stored in volatile memory 216 may not need to be tokenized or encrypted given that it may be more difficult for a malicious party to read the data from volatile memory 216 than from the persistent storage on computing device 210. Indeed, the access to the secure data may be restricted to dedicated web server 214 such that application 212 may send a request (e.g. HTTP request) to dedicated web server 214, which in turn may retrieve the secure data from volatile memory 216 and send the secure data to application 212 via a response (e.g. HTTP response). Note that dedicated web server 214 running on a local computing device 210 relative to application 212 may not be exposed to the Internet. Communications with dedicated web server 214 may occur over a local loopback interface and none of the traffic may enter the network. Dedicated web server 214 may also be associated with a session of the user executing application 212 on computing device 210, and other users on the same computing device may still not be able to access dedicated web server 214. The multiple layers of security may minimize the exposure of the dedicated web server 214 to unnecessary parties and as a result, the secure data stored in volatile memory 216 may not need to be tokenized or encrypted.

Dedicated web server 214 may cache the secure data in volatile memory 216 and dedicated web server 214 may serve subsequent requests from application 212 using the cached data. After the user terminates the session on application 212, stored data in volatile memory 216 may be deleted and dedicated web server 214 may be terminated.

Secure data management servers 220 may initiate and terminate dedicated web server 214 as needed. Secure data management servers 220 may monitor the execution of application 212 and the user session associated with application 212. After detecting that the user has sent a request from application 212 to remote data server 230 to access the secure data, secure data management servers 220 may initiate dedicated web server on computing device 210. Secure data management servers 220 may redirect a request from application 212 to dedicate web server 214 in the form of a HTTP request. Secure data management servers 220 may configure volatile memory 216 which may be accessible to dedicated web server 214.

In a variety of embodiments, secure data management servers 220 may implement dedicated web server 214 as a library in application 212 that may serve as a caching layer. Secure data management servers 220 may control the reading and writing operations of dedicated web server 214 in volatile memory 216. For example, secure data management servers 220 may build the dedicated web server and point a legacy application to the dedicated web server 214. The integration of the legacy application with the dedicated web server may be transparent to the legacy application given that the legacy application may need no or minimal change to adapt to the caching layer. Dedicated web server 214 may subsequently handle the relevant operations in the volatile memory, serve as an interface for the legacy application and provide a service of a virtual server.

After dedicated web server 214 detects that the user has terminated the session on application 212, or application 212 has been terminated on computing device 210, secure data management servers 220 may delete the secure data from volatile memory 216 and terminate dedicated web server 214.

Remote data servers 230 may receive requests from dedicated web server 214 to access secure data and further communicate with secure databases 240 to retrieve secure data. Secure databases 240 may be a repository that stores secure data. For example, secure databases 240 may store information related to previously conducted transactions by customers from a financial institute. Remote data servers 230 may receive requests from dedicated web server 214 to create or update secure data and further communicate with secure databases 240 to create or update a record in the databases. For example, remote data servers 230 may create a new transaction record and store the new transaction record in secure databases 240. Remote data servers 230 may be a system independent from secure databases 240. Secure databases 240 may also be a component residing on remote data servers 230.

Although secure data stored in volatile memory 216 may not need to be tokenized or encrypted, secure data management servers 220, secure data servers 230 and/or secure databases 240 may be associated with a particular authentication session. Secure data management servers 220, remote data servers 230 and/or secure databases 240 may receive, process, and store a variety of secure data such as transaction records, create and update transaction records in the databases as described herein. However, it should be noted that any device in non-persistent caching system 200 may perform any of the processes and/or store any data as described herein. Some or all of the data described herein may be stored using one or more databases. Databases may include, but are not limited to relational databases, hierarchical databases, distributed databases, in-memory databases, flat file databases, XML databases, NoSQL databases, graph databases, and/or a combination thereof. The network 280 may include a local area network (LAN), a wide area network (WAN), a wireless telecommunications network, and/or any other communication network or combination thereof.

The data transferred to and from various computing devices in non-persistent caching system 200 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the data sharing system 200.

Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in the non-persistent data caching system 200 in front of one or more computing devices such that any external devices may communicate directly with the specialized hardware.

Figure 3:
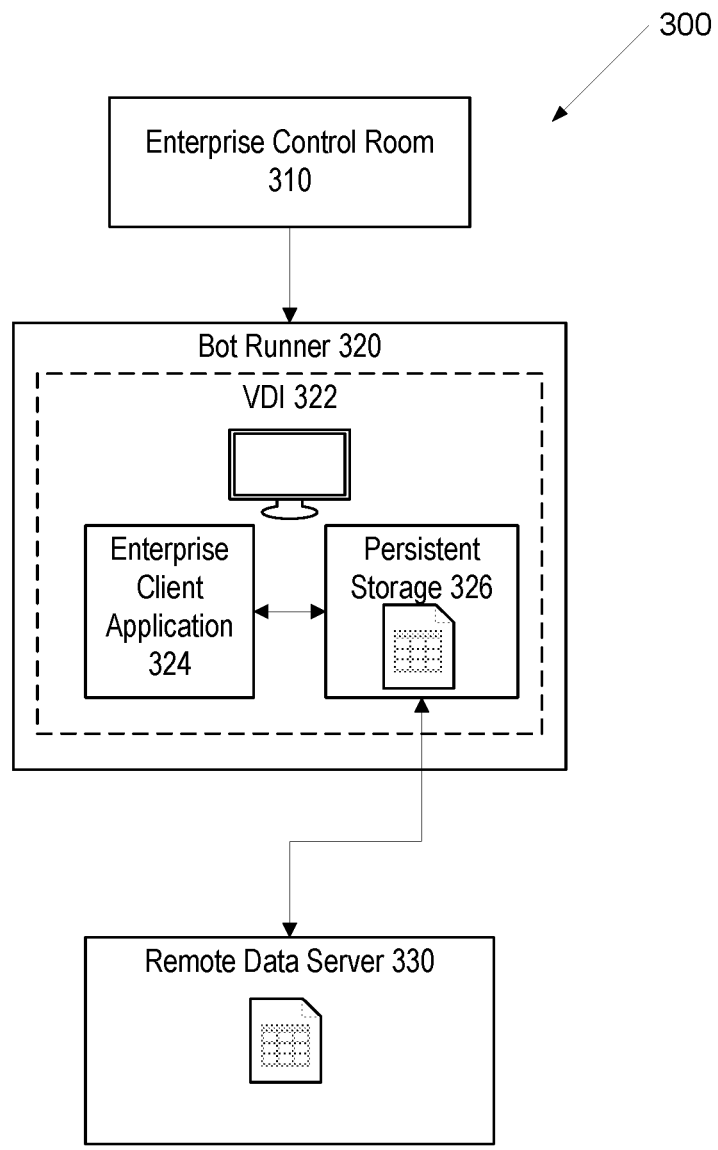
FIG. 3 shows an example system illustrating a problem that may be resolved by a system for non-persistent data caching via a dedicated web server in which one or more aspects described herein may be implemented.

FIG. 3 shows an example system illustrating a problem that may be resolved by using non-persistent data caching via a dedicated web server in which one or more aspects described herein may be implemented. As shown in FIG. 3, system 3000 may include an Enterprise Control Room 310, a Bot Runner 320, a virtual desktop infrastructure (VDI) 322, an enterprise client application 324, a persistent storage 326 and a remote data server 330. The Enterprise Control Room 310 may be in communication with the Bot Runner 320. The Bot Runner 320 may be a software machine that runs bots that may initiate the VDI 322 on a computing device. The VDI 322 may host the enterprise client application 324, which may access the persistent storage 326. After the Bot Runner 320 user logs in the first time, the computing device may be registered with the Enterprise Control Room 310 and the user can deploy bots on that device. The Enterprise Control Room 310 may act as the single point of access and control for bot execution and bots across the enterprise may be first uploaded to the Enterprise Control Room 310. The Bot Runners 320 may be registered to the Enterprise Control Room 310 before they are operable. The Enterprise Control Room 310 may execute bots via the Bot Runners 320. In the example of system 300, a user may attempt to access secure data on the remote data server 380 in an Excel or Comma Separated Value (CSV) file via the application 324 executing on a computing device or a desktop virtualization, such as the VDI 322.

In a conventional approach, the bot may download the requested secure data in the form of the encrypted or tokenized data from the remote data server 380. For example, the bot may download the encrypted secure data to the VDI 322, and the VDI 322 may be a form of desktop virtualization, where specific desktop images may run within virtual machines (VMs) and may be delivered to the computing device over a network. The bot may download the secure data to the VDI 322 for processing, create a temporary copy of the secure data and save to the persistent storage 326 on a disk of the computing device. Notably, the secure data may be stored in the persistent storage 326 in the encrypted or tokenized format, and the enterprise client application 324 may access the secure data in the persistent storage 326 directly. For each requested data, the bot may process the stored secure data, decrypt or detokenize the data as needed, and send the requested secure data in the decrypted format to the user via the enterprise client application 324. During this data transmission process, a significant amount of performance and security may be lost. The process to download the data in the persistent storage 326 and the communications over the network may cause the unencrypted data to have longer exposure to undesirable parties.

Figure 4:
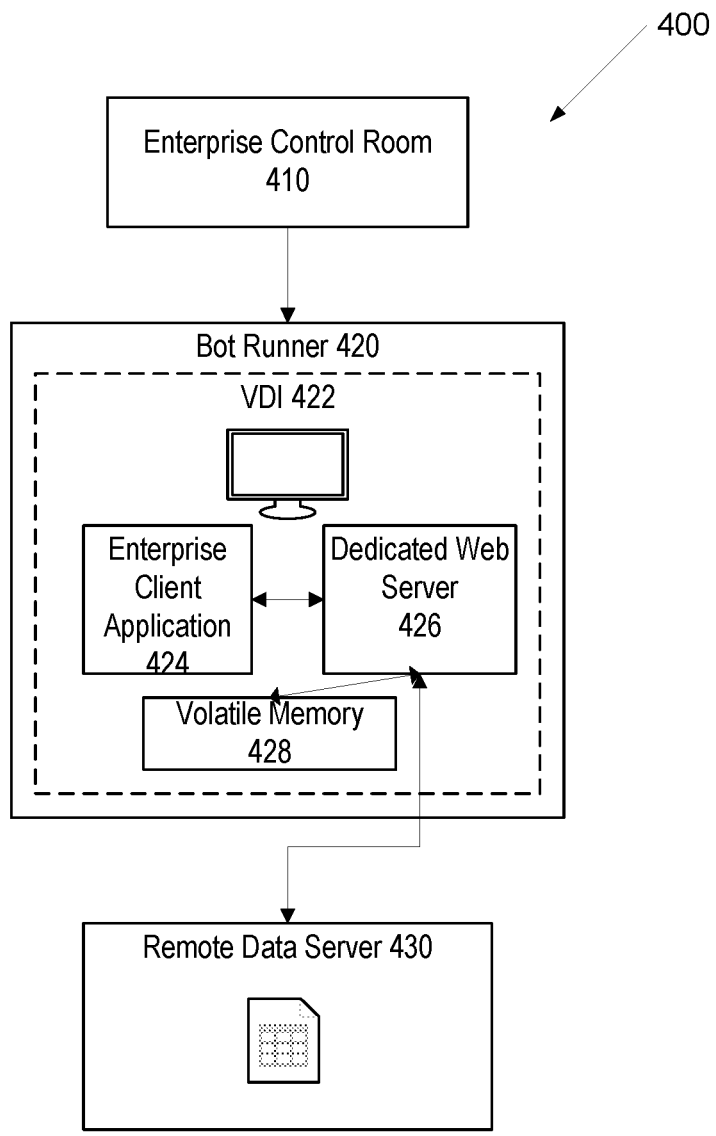
FIG. 4 shows an example system for non-persistent data caching via a dedicated web server in which one or more aspects described herein may be implemented.

FIG. 4 illustrates a novel solution using non-persistent data caching via a dedicated web server, which may alleviate some problems of the conventional approach mentioned above. According to some aspects, system 400 may include an Enterprise Control Room 410, a Bot Runner 420, a VDI 422, an enterprise client application 424, a dedicated web server 426, a volatile memory 428 and a remote data server 430. The Enterprise Control Room 410 may be in communication with the Bot Runner 420, which may run a bot to initiate the VDI 422 on a computing device and execute the enterprise client application 424. A user may attempt to access secure data in an Excel or CSV file on the remote data server 430 via the enterprise client application 424 on an instance of the VDI 422. In contrast with system 300 of FIG. 3, system 400 of FIG. 4 may implement the dedicated web server 426 on the VDI 422. For example, system 400 may detect that a user has sent a request to access the secure data on the remote data server 430 via the enterprise client application 424 and within a session of the VDI 422, system 400 may initiate the dedicated web server 426. The dedicated web server 426 may be local to the VDI 422 and may be valid during the VDI session. Rather than being stored in a persistent storage, the secure data may be pulled and stored in the volatile memory 428 of the VDI 422. Notably, the secure data stored in the volatile memory 428 may be in an unencrypted or non-tokenized format. The bot may process the stored secure data without the need of decryption and may send the requested secure data to the user. For example, the bot may retrieve the secure data from the volatile memory 428 as needed via a representational state transfer (REST) request and send to the enterprise client application 424. During this data transmission process, a significant amount of performance and security may be improved compared that with the system of 300, given that the encryption/decryption process may not be necessary, and the storage of the data in a non-persistent volatile memory 428 may minimize the exposure of the secure data to undesirable parties.

In some examples, although the secure data stored in the volatile memory 428 may be in a non-tokenized or unencrypted format, the secure data may be retrieved from the remote data server 430 in an encrypted or tokenized format. System 400 may decrypt or detokenize the secure data before storing it in the volatile memory 428. The dedicated web server may send a first portion of the secure data to the enterprise client application 424 as requested by the user. If the user requests a second portion of the secure data, the dedicated web server may retrieve the cached secure data in the unencrypted format from the volatile memory 428, and send the second portion of the secure data to the enterprise client application 424. System 400 may not allow the enterprise client application 424 to access the volatile memory 428. The dedicated web server may act as a proxy to the enterprise client application 424, which may send HTTP request to the dedicated web server for data access and update and receive HTTP response from the dedicated web server.

After detecting that user has terminated a session in the enterprise client application 424 and the bot may terminate the enterprise client application 424 and the VDI session. System 400 may subsequently delete the secure data from the volatile memory 428 and terminate the dedicated web server.

Non-Persistent Data Caching Using a Dedicated Web Server

Figure 5:
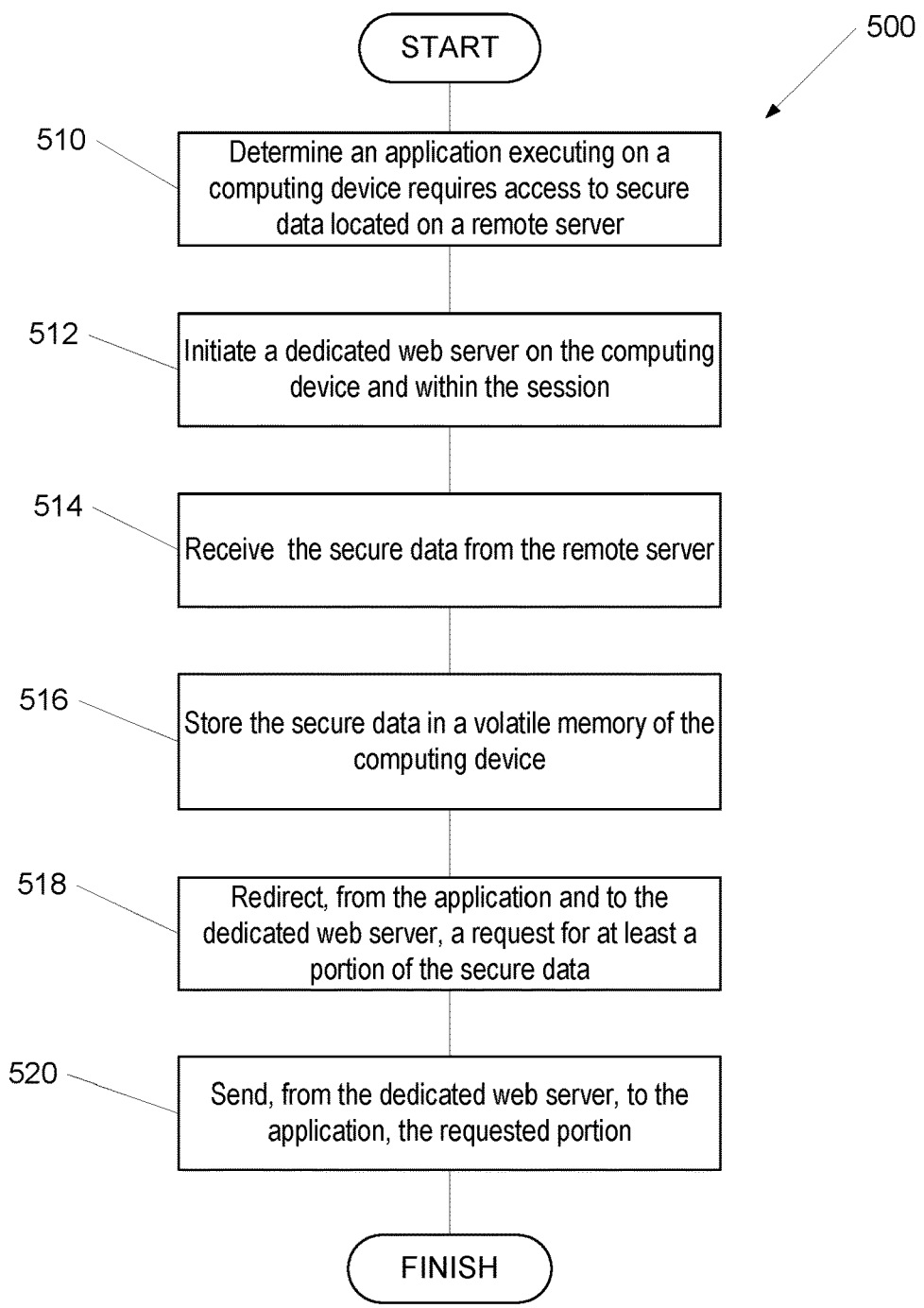
FIG. 5 shows a flow chart of a process for features for non-persistent data caching via a dedicated web server according to one or more aspects of the disclosure.

FIG. 5 shows a flow chart of a process for non-persistent data caching using a dedicated web server according to one or more aspects of the disclosure. Some or all of the steps of process 500 may be performed using one or more computing devices as described herein.

At step 510, an application executed on a computing device that requires access to secure data located on a remote data server may be determined. A user may initiate a session on the application executed in the computing device or on a virtual desktop such as a VDI. The user may request access to secure data such as information related to financial transactions from a remote data server. The user may attempt to access sensitive data from external sources such as Google drive, Microsoft Team Site or Amazon S3, etc. For example, the user may send a request via a browser on the computing device to remote data servers in a financial institute to access information related to a previous transaction. The financial institute may store in a remote data server a financial statement on a bank account associated with the user.

In a variety of embodiments, the non-persistent data caching system may monitor and detect on the computing device, that a user has initiated a session on an application to request access sensitive data on the remote data server. The non-persistent data caching system may monitor certain browser events or combinations of the key strokes to determine that the user has initiated the session. The non-persistent data caching system may monitor the relevant application and processes executing on the computing device. The non-persistent data caching system may listen for HTTP request on certain ports that may be used to communicate with the remote data servers.

At step 512, a dedicated web server may be initiated on the computing device and within the user session. After detecting that the user's request for the sensitive secure data, the non-persistent data caching system may initiate a dedicated web server on the computing device. The dedicated web server may be local to the application executing on the computing device. In a variety of embodiments, the dedicated web server may be implemented as a web server independent from the application. For example, the dedicated web server may be implemented as Python Data Broker. In a variety of embodiments, the dedicated web server may be implemented as a library which may be plugged into the application. The integration of the dedicated web server and the application may be transparent to the application, which may require minimal changes to the codes of the application. The dedicated web server may communicate with the application via HTTP protocol. As such, the dedicated web server may be adaptive to applications written in a variety of programming languages.

In a variety of embodiments, the web server may be dedicated to the application to minimize its exposure. For example, the dedicated web server may be accessible to the application alone. Other applications executing on the same computing device may not access the dedicated web server. Other external applications executing on other computing devices may not access the dedicated web server.

In a variety of embodiments, the dedicated web server may be associated with a session of the specific user. The dedicated web server may intercept requests from the user and process such requests accordingly. The dedicated web server may not handle requests from other users of the same application. Once the session is terminated by the user, the dedicated web server may be terminated and may not handle requests from the same user if the user starts a new session.

For example, the dedicated web server may be implemented via the following functions:

```
// This function will start a webserver listening on the localhost for http
// requests. The server runs for as long as needed until it is shut down.
function StartWebServer( ) do
    set port = GetPortFromOS( )
    ListenForHTTPRequestsOnPort(port)
    for (incoming_request in requests) do
        HandleRequest(incoming_request)
    end
end
// Handles an incoming request that the webserver received.
function HandleRequest(request) do
    if (request is a shut_down_request) do
        HandleShutdownRequest(request)
    end else if (request is a download_request) do
        HandleDownloadRequest(request)
    end else if (request is a data_request) do
        HandleDataRequest(request)
    end else if (request is a close_request) do
        HandleCloseRequest(request)
    end else do
        // User wants to do something else with this server, but this server
        // does not handle those requests.
        RespondWithErrorMessage( )
    end
end
// User wants to shut the server down, so scrub memory and shut the
server down.
function HandleShutdownRequest(request) do
    ScrubAllFilesFromMemory( )
    ShutDown( )
    RespondWithSuccessMessage( )
end
```

At step 514, the secure data may be retrieved from the remote data server. The dedicated web server may retrieve the secure data from the remote data server. For example, the dedicated web server may retrieve a monthly financial statement related to a user's bank account including information related to a previous transaction from remote data servers associated with a financial institute. The secure data may be retrieved in an encrypted or tokenized format. The secure data may also be retrieved in an unencrypted or non-tokenized format.

At step 516, the secure data may be stored in a volatile memory of the computing device. The volatile memory may be accessible by the dedicated web server. The dedicated web server may not store the secure data in a persistent storage. In fact, given that the secure data may be stored in the volatile memory, it may not need to be tokenized or encrypted before being placed in the persistent storage, as required in a conventional system, where there may be more security concerns of using a physical persistent drive on the computing device. The dedicated web server may cache the secure data for the duration of the application that may need the secure data.

In a variety of embodiments, the volatile memory may not be accessible by the application directly. When the application may need to access the secure data, the application may send requests directly to the web server using HTTP requests. The dedicated web server may check on the volatile memory. If the requested data is cached in the volatile memory, the dedicated web server may retrieve the secure data and send the secure data to the application via HTTP responses. If the requested data is not cached in the volatile memory, the dedicated web server may retrieve data from remote data servers, store the secure data in the volatile memory, and send the requested date to the application.

In a variety of embodiments, the volatile memory may not be accessible by other applications executing on the computing device. Any external applications executing on other computing devices may not access the dedicated web server.

The dedicated web server may retrieve and store the unencrypted secure data in the volatile memory. For example, the dedicated web server may retrieve the unencrypted secure from the remote data server. In other examples, the dedicated web server may retrieve the encrypted secure data from the remote data server, a third party server may decrypt the secure data on behalf of the dedicated web server before the unencrypted secure data may be stored in the volatile memory. In still other examples, the dedicated web server may retrieve the encrypted secure data from the remote data server, decrypt the secure data, and stored the decrypted data in the volatile memory.

In a variety of embodiments, after retrieving the secure data from the remote data servers, the dedicated web server may create an in-memory file to store the secure data, assign the in-memory file to a file data stream, and download the secure data to the in-memory file via the file data stream. For example, the following pseudocode algorithm may implement the relevant function to store the secure data to the volatile memory:

```
// User is requesting to download a file, download that data but make sure
// that it is not committed to hard disk.
function HandleDownloadRequest(request) do
// Below is an in memory file, that is treated by other libraries like
// a real file, but its data is not committed to hard disk and only
// lives in RAM (volatile memory).
   set file_data_stream = FakeFileStream( )
   set external_lib = GetExternalLibraryForRequest(request)
   DownloadDataToFile(file_data_stream)
   LoadFileForProcessing(external_lib, file_data_stream)
   RespondWithSuccessMessage( )
end
```

At step 518, a request for at least a portion of the secure data may be received from the application and redirected to the dedicated web server. The dedicated web server may serve as a proxy layer between the application and the remote data server located on an external network. The application and the dedicated web server may communicate via a loopback interface on the computing device. At step 420, the dedicated web server may send the requested portion to the application.

The user may request a first portion of the secure data from the dedicated web server. The dedicated web server may retrieve the secure data, store the secure data in the volatile memory and send the first portion to the user. In the same user session, the user may request a second portion of the secure data from the dedicated web server. The dedicated web server may determine that the second portion is cached in the volatile memory and may retrieve the second portion from the volatile memory. For example, the following pseudocode algorithm may implement the relevant function to retrieve the cached secure data from the volatile memory:

```
// User wants data that is cached on the webserver. Get the data from an
// external library that processed the data when it was downloaded and
// send it to the user.
   function HandleDataRequest(request) do
      set external_lib = GetExternalLibraryForRequest(request)
      set data = GetDataFromLibrary(external_lib, request)
      RespondWithData(data)
   end
```

The non-persistent data caching system may monitor and detect on the computing device, where a user has terminated the session on the application. The non-persistent data caching system may monitor and detect on the computing device, that a user has been idle for a threshold period of time and may terminate the session for the user. The non-persistent data caching system may terminate the application executing on the computing device, delete the secure data from the volatile memory, and terminate the dedicated web server on the computing device. For example, the following pseudocode algorithm may implement the relevant functions to scrub the secure data from the volatile memory and shutdown the dedicate web server gracefully:

```
// User wants to close a file. Find the library that is storing the file in
// memory and tell the library to scrub the file from memory.
   function HandleCloseRequest(request) do
      set external_lib = GetExternalLibraryForRequest(request)
      ScrubFileFromMemory(external_lib, request)
      RespondWithSuccessMessage( )
   end
// Gracefully shuts down the webserver.
   function ShutDown( ) do
      StopListeningForRequests( )
      ExitProgram( )
   end
```

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
   initiating a dedicated web server on a computing device and within a dedicated session for a first user requesting access to secure data on a remote server, wherein the dedicated web server is local to an application executing on the computing device and inaccessible to other applications executing on the computing device;
   storing, by the dedicated web server, the secure data in a volatile memory of the computing device, wherein access to the volatile memory is limited to the dedicated web server;
   receiving, from the application on behalf of the first user and by the dedicated web server, a request for at least a portion of the secure data, wherein the request is within the dedicated session;
   sending, by the dedicated web server, to the application and in response to the request, the requested at least the portion of the secure data; and
   after terminating the dedicated session for the first user, terminating the dedicated web server.

2. The computer-implemented method of claim 1, further comprising:
   prior to storing the secure data in the volatile memory, retrieving, by the dedicated web server and from the remote server, the secure data.

3. The computer-implemented method of claim 1, wherein the secure data is not stored in a persistent storage on the computing device.

4. The computer-implemented method of claim 1, wherein the secure data stored in the volatile memory is non-tokenized or non-encrypted.

5. The computer-implemented method of claim 1, further comprising:
   retrieving the secure data from the remote server in an encrypted format; and
   wherein storing the secure data comprises storing the secure data in the volatile memory in a non-encrypted format.

6. The computer-implemented method of claim 1, wherein the volatile memory is inaccessible to the application and the other applications executing on the computing device.

7. The computer-implemented method of claim 1, wherein the receiving the request for the at least the portion of the secure data comprises receiving, from the application, by the dedicated web server and via a local loopback interface, the request.

8. The computer-implemented method of claim 1, wherein the storing the secure data comprises:
   creating an in-memory file to store the secure data;
   assigning the in-memory file to a file data stream; and
   downloading the secure data to the in-memory file via the file data stream.

9. The computer-implemented method of claim 1, wherein the computing device hosts a virtual desktop infrastructure (VDI), and wherein the dedicated session is a VDI session associated with the first user.

10. The computer-implemented method of claim 1, wherein the terminating the dedicated web server further comprises:
    after terminating the dedicated session for the first user, terminating the application executing on the computing device; and
    after terminating the application, terminating the dedicated web server on the computing device.

11. The computer-implemented method of claim 10, further comprising:
    prior to terminating the dedicated web server, deleting the secure data from the volatile memory.

12. The computer-implemented method of claim 1, further comprising:
    receiving, from the application, within the dedicated session for the first user and by the dedicated web server, a new request for a new portion of the secure data;
    retrieving, by the dedicated web server and from the volatile memory, the new portion of the secure data; and
    sending, by the dedicated web server, to the application and in response to the new request, the requested new portion of the secure data.

13. A secure data processing system comprising:
    one or more processors; and
    memory storing instructions that, when executed by the one or more processors, cause the secure data processing system to:
    initiate a dedicated web server on a computing device and within a dedicated session for a first user requesting access to secure data on a remote server, wherein the dedicated web server is local to an application executing on the computing device and inaccessible to other applications executing on the computing device;
    store the secure data in a volatile memory of the computing device, wherein access to the volatile memory is limited to the dedicated web server;
    receive, from the application on behalf of the first user, a request for at least a portion of the secure data, wherein the request is within the dedicated session;
    send to the application and in response to the request, the requested at least the portion of the secure data; and
    after terminating the dedicated session for the first user, terminate the dedicated web server.

14. The secure data processing system of claim 13, wherein the instructions, when executed by the one or more processors, further cause the secure data processing system to:
    prior to storing the secure data in the volatile memory, retrieve, from the remote server, the secure data.

15. The secure data processing system of claim 13, wherein the secure data is not stored in a persistent storage on the computing device.

16. The secure data processing system of claim 13, wherein the secure data stored in the volatile memory is non-tokenized or non-encrypted.

17. The secure data processing system of claim 13, wherein the instructions, when executed by the one or more processors, further cause the secure data processing system to:
    retrieve the secure data from the remote server in an encrypted format; and
    store the secure data in the volatile memory in a non-encrypted format.

18. The secure data processing system of claim 13, wherein the volatile memory is inaccessible to the application and the other applications executing on the computing device.

19. One or more non-transitory media storing instructions that, when executed by one or more processors, cause the one or more processors to perform steps comprising:

initiating a dedicated web server on a computing device and within a dedicated session for a first user requesting access to secure data on a remote server, wherein the dedicated web server is local to an application executing on the computing device and inaccessible to other applications executing on the computing device;

storing, by the dedicated web server, the secure data in a volatile memory of the computing device, wherein access to the volatile memory is limited to the dedicated web server;

receiving, from the application on behalf of the first user and by the dedicated web server, a request for at least a portion of the secure data, wherein the request is within the dedicated session;

sending, by the dedicated web server, to the application and in response to the request, the requested at least the portion of the secure data; and after terminating the dedicated session for the first user, terminating the dedicated web server.

20. The non-transitory media of claim 19, wherein the secure data stored in the volatile memory is non-tokenized or non-encrypted.

* * * * *